United States Patent
Bufton et al.

(10) Patent No.: US 10,058,108 B2
(45) Date of Patent: Aug. 28, 2018

(54) EDIBLE PRODUCT AND METHOD OF MANUFACTURE

(71) Applicant: Mondelez UK R&D Limited, Birmingham (GB)

(72) Inventors: Andrew Christopher Bufton, Birmingham (GB); Parbinder Cheema, Birmingham (GB)

(73) Assignee: Mondelez UK R&D Limited, Bournville (GB)

( * ) Notice: Subject to any disclaimer, the term of this patent is extended or adjusted under 35 U.S.C. 154(b) by 0 days.

(21) Appl. No.: 14/408,925

(22) PCT Filed: May 15, 2013

(86) PCT No.: PCT/GB2013/051250
§ 371 (c)(1),
(2) Date: Dec. 17, 2014

(87) PCT Pub. No.: WO2013/190265
PCT Pub. Date: Dec. 27, 2013

(65) Prior Publication Data
US 2015/0320072 A1    Nov. 12, 2015

(30) Foreign Application Priority Data

Jun. 18, 2012    (GB) .................................. 1210848.6

(51) Int. Cl.
*A23G 1/54*    (2006.01)
*A23G 1/00*    (2006.01)
(Continued)

(52) U.S. Cl.
CPC ........... *A23G 1/0056* (2013.01); *A21D 13/22* (2017.01); *A21D 13/24* (2017.01); *A21D 13/31* (2017.01);
(Continued)

(58) Field of Classification Search
CPC . A23G 1/54; A23G 1/00; A23G 1/545; A23G 1/0056; A23G 3/0021; A23G 3/54;
(Continued)

(56) References Cited

U.S. PATENT DOCUMENTS

| 3,279,393 A | 10/1966 | Otken |
| 4,504,511 A | 3/1985 | Binley |
| 2003/0082254 A1 | 5/2003 | Shorey |
| 2005/0064087 A1 | 3/2005 | Richey et al. |
| 2007/0104828 A1* | 5/2007 | Fornaguera ............ A23G 1/54 426/3 |
| 2013/0064951 A1 | 3/2013 | Haines et al. |

FOREIGN PATENT DOCUMENTS

| EP | 1797765 A1 | 6/2007 |
| GB | 189400 A | 11/1922 |

(Continued)

OTHER PUBLICATIONS

International Search Report, dated Aug. 2, 2013 for PCT/GB2013/051250 (4 pgs.).
(Continued)

*Primary Examiner* — Subbalakshmi Prakash
(74) *Attorney, Agent, or Firm* — Fitch, Even, Tabin & Flannery LLP (57) ABSTRACT

This invention provided an edible product having a plurality of adjacent extruded product portions comprising one or more of chocolate, baked or unbaked cereal-based composition, or cheese. The portions are connected to one another along their length by a frangible connecting portion. The invention also provides a method of manufacturing such a product. The method includes providing an extrusion die having a linear array of at least two interconnected openings therein; and extruding product portions through the die to produce the product. The product comprises at least one or more edible materials comprising: chocolate products, baked or unbaked cereal-based composition, or cheeses.

14 Claims, 8 Drawing Sheets

(51) Int. Cl.
| | |
|---|---|
| *A23G 3/34* | (2006.01) |
| *A23G 3/54* | (2006.01) |
| *A23C 19/09* | (2006.01) |
| *A23P 30/20* | (2016.01) |
| *A23P 30/25* | (2016.01) |
| *A21D 13/31* | (2017.01) |
| *A21D 13/24* | (2017.01) |
| *A21D 13/37* | (2017.01) |
| *A21D 13/45* | (2017.01) |
| *A21D 13/36* | (2017.01) |
| *A21D 13/32* | (2017.01) |
| *A21D 13/22* | (2017.01) |

(52) U.S. Cl.
CPC ............. *A21D 13/32* (2017.01); *A21D 13/36* (2017.01); *A21D 13/37* (2017.01); *A21D 13/45* (2017.01); *A23C 19/09* (2013.01); *A23G 1/00* (2013.01); *A23G 1/54* (2013.01); *A23G 1/545* (2013.01); *A23G 3/0021* (2013.01); *A23G 3/54* (2013.01); *A23P 30/20* (2016.08); *A23P 30/25* (2016.08); *A23V 2002/00* (2013.01)

(58) Field of Classification Search
CPC ............. A21D 13/0006; A21D 13/0009; A21D 13/0022; A21D 13/0025; A21D 13/0035; A21D 13/0038; A21D 13/008; A23C 19/09; A23L 1/0076; A23L 1/0079; A23V 2002/00
USPC .......... 426/93, 282, 302, 306, 514, 516, 631
See application file for complete search history.

(56) References Cited

FOREIGN PATENT DOCUMENTS

| | | | |
|---|---|---|---|
| RU | 2292739 | 4/2005 | |
| WO | 0106858 A1 | 2/2001 | |
| WO | 2001006858 A1 | 2/2001 | |
| WO | WO 0106858 A1 * | 2/2001 | ............. A21C 11/12 |
| WO | 02069739 | 9/2002 | |
| WO | 2003086094 A1 | 10/2003 | |
| WO | 2011104564 A1 | 9/2011 | |

OTHER PUBLICATIONS

Intellectual Property Office Search Report dated Sep. 19, 2012 for Application No. GB1210848.6 (3 pgs.).
New Zealand Intellectual Property Office First Examination Report dated Aug. 14, 2015 for New Zealand IP No. 630002 (2 pgs.).
Examination Report dated Mar. 16, 2016 for Application No. GB1210848.6 (2 pgs.).
Examination Report dated Dec. 15, 2015 for Application No. GB1210848.6 (3 pgs.).
Response dated Feb. 11, 2016 to the Examination Report dated Dec. 15, 2016 for Application No. GB1210848.6 (13 pgs.).
"Kit Kat," retrieved from the internet: URL:https://en.wikipedia.org/wiki/Kit_ Kat, retrieved on May 6, 2016 (10 pgs.).
English translation of Office Action for Russian Patent Application No. 2014139547 (2 pgs.).
Examination Report, dated Nov. 16, 2016 for Application No. GB1210848.6 (1 pg.).

* cited by examiner

EDIBLE PRODUCT AND METHOD OF MANUFACTURE

CROSS REFERENCE TO RELATED APPLICATIONS

This application is a U.S. national phase application of International Application No. PCT/GB2013/051250, filed May 15, 2013, which claims benefit from from Great Britain Application 1210848.6, filed Jun. 18, 2012, which are hereby incorporated herein by reference in their entirety.

FIELD

This invention relates to a new confectionery product and methods of making the same, en particular it relates to extruded confectionery products.

BACKGROUND

Although die heads for making extruded products are very accurately sized, the actual product that is produced by extrusion through the die heads varies in size. This is due to a number of influencing factors which includes the pressure drop across the die head, expansion of the extruded product as it exits, or after it exits, the die head and variation in take off speed.

When packaging an extruded product containing multiple items, for example a multi-finger confectionery product, the variation in size of the items can be problematic as the packaging equipment needs to be able to deal with a range of sizes from the narrowest and shortest to the widest and longest product that is produced. This is compounded in a twin item product as a tolerance stack for the two individual items occurs, increasing the overall tolerance band. Furthermore an additional tolerance stack is introduced due to the tolerance band of the placement of the two products adjacent one another before packaging.

When producing known twin portion products, the efficiency of the manufacturing process is not optimised. Each portion of the twin portion product is approximately 50% of the total packaged weight as they are packed in pairs. The effect of this is the output through a die head for producing a single portion of a twin portion product is effectively half that of the output through a die head for producing a single portion product having a weight equal to the total weight of the two portion product. This can therefore reduce plant throughput by 50%.

Furthermore when manufacturing a known twin portion product further additional complexity, and associated costs are incurred in the process as additional machinery is required for collating the two portions for packaging.

The overall effect of the above is that the process of producing extruded twin portion products, and the process of packaging these together in a single packaging, is difficult and costly.

The problems set out above are further exacerbated when 3, 4 or more items or portions are present in the product.

SUMMARY

It is the purpose of the present invention to provide an improved product and process that at least partially mitigates these problems.

According to a first aspect of the invention there is provided an edible product comprising a plurality of adjacent extruded product portions comprising one or more of: chocolate, baked or unbaked cereal-based composition, or cheese, said portions connected to one another along their length by a frangible connecting portion.

The cereal-based composition may be a dough or batter.

The term 'cereal based' in the context of the various aspects of the present invention and as used throughout this document refers to a composition involving starch containing plant materials such as grains, pulses, legumes and tubers, for example flours, grits or groats from wheat, maize, rice, oats, potatoes, lentil, pea and other farinaceous ingredients. These can be combined with one or more protein rich vegetable ingredients such as fat reduced meals, concentrates and isolates from for example nuts, soy, peanut and pea origin, and vegetable derived fibrous materials such as pea fibre and fruit fibre. The composition may be of an expanded or partly expanded nature.

The product portions may comprise a co-extrusion of different edible materials.

The product may be at least partially coated with an edible coating, such as a confectionery coating, for example chocolate, panned sugar or sugarless syrups and powders or solidified yoghurt-based coatings.

The term 'chocolate' in the context of the various aspects of the present invention and as used throughout this document is not restricted by the various definitions of chocolate provided by government and regulatory bodies. The term chocolate should be construed as covering not only chocolate compositions which can be sold as "chocolate" in countries where chocolate is legally defined, but also chocolate compositions which, because of fat, cocoa content etc. may not be legally described as "chocolate" in those countries. A chocolate is simply a product obtained from cocoa products and sweeteners. The term chocolate includes milk chocolate, plain chocolate, white chocolate, sweet chocolate, dark chocolate, or any combination thereof As used herein, a "chocolate composition" is a confectionery composition comprising at least non-fat cocoa solids and/or cocoa butter and optionally CBR cocoa butter replacement (cocoa butter equivalent (CBE) and/or cocoa butter replacement (CBS)). CBEs are defined in Directive 2000/36/EC. Suitable CBEs include illipe, Borneo tallow, tengkawang, palm oil, sal, shea, kokum gurgi and mango kernel. CBE's are usually used in combination with cocoa butter. In one embodiment, the chocolate shell material comprises no more than 5 wt % CBE's. Suitable CBS's include CBS laurics and CBS non-laurics, CBS laurics are short-chain fatty acid glycerides. Their physical properties vary but they all have triglyceride configurations that make them compatible with cocoa butter. Suitable CBS's include those based on palm kernel oil and coconut oil. CBS non-laurics consist of fractions obtained from hydrogenated oils. The oils are selectively hydrogenated with the formation of trans acids, which increases the solid phase of the fat. Suitable sources for CBS nonlaurics include soya, cottonseed, peanut, rapeseed and corn (maize) oil.

It will be appreciated that the plurality of product portions and the frangible portion are extruded in a single process to form a single extrudate, or unitary product.

The invention may include one or more of the following features.

The frangible connection portion may be breakable by a bending moment applied to the product portions across the connecting portion.

The frangible connecting portion may have a width less than that of any one of the product portions. The width of the frangible portion may be from 2% to 100% of the width of any one of the product portions, from 5% to 80% of or from 15% to 50%. In some embodiments the width of the frangible portion is at least 2%, 3%, 4%, 5%, 10%, 15% or 20% of the width of any one of the product portions. In some embodiments the width of the frangible portion is no more than 80%, 70%, 60%, 50%, 40% or 30% of the width of any one of the product portions. By width it will be understood that this measurement refers to the dimension of the frangible portion separating adjacent product portions.

The frangible connecting portion may have a height less than that of any one of the product portions. The height of the frangible portion may be from 5% to 75%, from 5% to 60% or from 10% to 50% of the height of any one of the product portions. In some embodiments the height of the frangible portion is at least 5%, 10% or 15% of the height of the product portions. In some embodiments the height of the frangible portion is no more than 70%, 60% or 50% of the height of the product portions. By height it will be understood that this measurement refers to the thickness of the frangible portion perpendicular to the width.

The frangible connecting portion may extend continuously along the length of the product.

The frangible connecting portion may have at least one recess therein defining a preferential break line. The recess may be an angled, a U-shape, or a V-shaped recess. Alternatively other shaped recesses that define a preferential break line may be used.

If desired, a further non extruded confectionery product may be located in the recess formed between the portions of the product of the invention.

In one arrangement the product portions comprise bite size pieces which may be from 2 to 5 cm in length along the axis of extrusion. In another preferred embodiment the product portions may comprise bars of product. The bars may have a length greater than one or both of their width and height, and may be from 5 to 50 cm long, or from 10 to 20 cm long.

Specific examples of products according to the first aspect of the invention may include: solid chocolate products, products containing different types of chocolate (dark/milk etc), extruded wafer products, extruded layered chocolate/ creme and wafer products; extruded biscuit dough, which may be cooked pre or post extrusion; filled extruded biscuit dough; and any of the preceding products in combination with a confectionery coating, for example chocolate.

The product portions may comprise one or more types of particulate inclusion, such as chocolate chips, nut pieces, fruit pieces, flavour chips, dried herbs and spices, toffee pieces, biscuit or cake pieces, sugar-confectionery pieces, dragees, and the like, for example. The product portions may comprise one or more liquid inclusions or components such as caramel, fruit paste, cream, cream cheese and other soft cheeses, liquid flavour bubbles and the like for example.

The or each product portion may be a hollow portion. The or each hollow portion may be filled with any suitable edible material, which may be solid, liquid or a mixture thereof. Suitable fillings include liquid chocolate, caramel, praline, toffee, fudge, sugar and sugarless syrups, peanut butter, cream, soft cheese, fruit paste, cake material, nut paste, truffle, and the like, for example.

According to a second aspect of the invention there is provided a method of manufacturing an edible product comprising: providing an extrusion die having a linear array of at least two interconnected openings therein; and extruding product portions comprising independently at least one or more edible materials comprising: chocolate products, baked or unbaked cereal-based composition, or cheeses, through said die head so as to produce an edible product comprising a plurality of extruded product portions connected to one another along at least a portion of their length by a frangible connecting portion.

The baked or unbaked cereal-based composition may comprise a dough or batter.

The method may comprise: providing an extrusion die having a linear array of at least two interconnected openings therein; and co-extruding two or more of the above mentioned edible materials through said die head so as to produce an edible product comprising two or more co-extruded product portions, said product portions connected to one another along at least a portion of their length by a frangible connecting portion.

The two or more edible products may include, for example, two chocolates, e.g. a dark chocolate and a milk chocolate or two different cheeses.

Prior to extrusion, the edible material(s) may be provided with one or more types of particulate inclusion, such as chocolate chips, nut pieces, fruit pieces, flavour chips, dried herbs and spices, toffee pieces, biscuit or cake pieces, sugar-confectionery pieces, dragees, and the like, for example. Alternatively or in addition, the edible materials may be provided with one or more liquid inclusions or components such as caramel, fruit paste, cream, cream cheese and other soft cheeses, liquid flavour bubbles and the like for example. It will be understood that said solid and or liquid inclusions may be included selectively in the edible material(s) such that the nature of, or even the presence of, inclusions is different in each of the extruded product portions.

The extrusion may be effected such that at least one of the extruded product portions is hollow. Furthermore, an edible material filling may be fed into the hollow portion, for example as it is formed during extrusion. The edible material filling may be solid, liquid or a mixture thereof. Suitable fillings include liquid chocolate, caramel, praline, toffee, fudge, sugar and sugarless syrups, peanut butter, cream, soft cheese, fruit paste, cake material, nut paste, truffle, and the like, for example.

The method may further comprise at least partially coating said edible product with one or more further edible materials. The edible materials may be confectionery materials and may include chocolate or yoghurt based coatings.

The method of the invention may include the following features:

Providing an extrusion die having a linear array of at least two interconnected openings therein may comprise providing a die wherein the interconnections between the openings have a height that is less than the height of the openings such that the frangible connecting portion is thinner than the confectionery bars. The height of the interconnections may be from 6% to 75%, from 5% to 60% or from 10% to 50% of the height of the openings. In some embodiments the height of the interconnections is at least 5%, 10% or 15% of the height of the openings. In some embodiments the height of the interconnections is no more than 70%, 60% or 50% of the height of the openings.

The interconnections may have a width less than that of the openings. The width of the interconnections may be from 2% to 100%, from 5% to 80% or from 5% to 50% of the width of the openings. In some embodiments the width of the interconnections is at least 2%, 3%, 4%, 5%, 10%, 15% or 20% of the width of the openings. In some embodiments the width of the interconnections is no more than 80%, 70%, 60%, 50%, 40% or 30% of the width of the openings. By width it will be understood that this measurement refers to the dimension along the interconnections between the two openings.

The method may further comprise separating the extruded product, along an axis substantially perpendicular to its axis of extrusion, to form a plurality of edible products, each comprising two or more product portions connected to one another by the frangible portion. Separating the extruded product may comprise cutting the extruded product.

The method may further comprise wrapping the extruded product. Wrapping the extruded product may comprise flow wrapping the extruded product.

BRIEF DESCRIPTION OF THE DRAWINGS

Specific embodiments of the invention will now be described by way of example only, with reference to the accompanying drawings in which.

DETAILED DESCRIPTION

Figure 1:
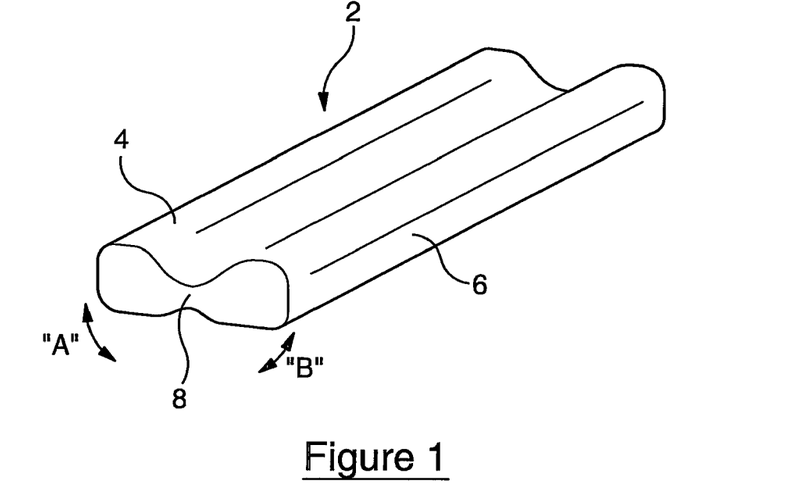
FIG. 1 shows a product in accordance with the invention.

Referring to FIG. 1 a chocolate bar 2 is shown. The chocolate bar 2 comprises two fingers 4, 6 which are parallel to one another and which are separated by a frangible connecting portion 8. The fingers 4, 6 are preferably between 10 and 20 cm long although it will be appreciated that bars with longer fingers may be produced. It will also be appreciated that bars with shorter bars may be produced so that, for example, when separated each bar forms a bite sized product portion. As can be seen the frangible connecting portion 8 has a lesser height than that of the fingers 4, 6, and extends along the length of the bar 2. The bar is made up of an extrudate and provides a simple edible product that can easily be split in two for sharing, or to allow the consumer to only eat half of the bar at a particular time. The bar can be split into two along its frangible connection portion by applying pressure on the bars to create a bending moment, as depicted by the arrows "A" and "B", across the frangible section. As it has a thinner chocolate thickness than the bars 4, 6, under the application of a bending moment the frangible portion 8 will break.

The bars 4, 6 of FIG. 1 have curved or rounded edges which assist in the flow of the molten or heat softened chocolate as the bar is extruded.

As the bar 2 is provided by extruding chocolate it will be appreciated that the product shown in FIG. 1 is a section of the length of the extrudate and that in production it will be necessary to separate the extrudate into sections of a required length. This may be done by any known technique, for example by cutting.

Figure 2:
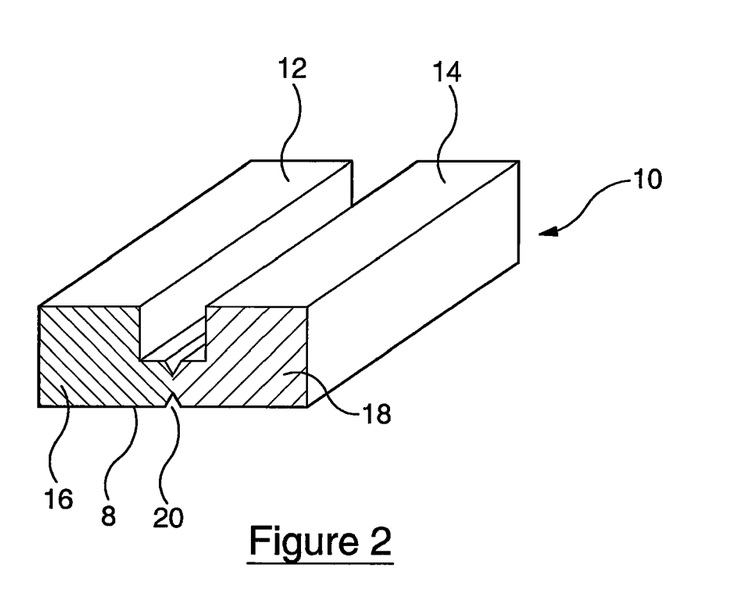
FIG. 2 shows another product in accordance with the invention.

Referring to FIG. 2 a confectionery bar 10 of the invention is shown that comprises a first finger 12 made of a first confectionery 16 and a second finger 14 made of a second confectionery 18. The bar is formed by co-extruding the two confectioneries through a die so that, as they solidify, they adhere to one another to form a unitary product. The fingers 12, 14 may have substantially square corners although it will be appreciated that the corners may be more rounded as, for example, shown in FIG. 1.

The first confectionery product 16 is a milk chocolate product and the second confectionery product 18 is a white chocolate product. In this manner a bar 12 can be produced that has the benefits associated with a single extrusion, but which offers product choice to the consumer at the point of consumption.

The frangible section 8 of the bar 10 is provided with a v-shaped groove 20 which runs along its upper and lower sides substantially centrally thereof. When a bending moment, as depicted at "A" and "B" of FIG. 1, is applied to the bar of FIG. 2 these V-shaped grooves 20 not only reduce the thickness along the centre of the frangible connecting portion 8 but create stress concentrations that will induce the bar 10 to preferentially break along the line of the v-shaped grooves 20, thereby creating a neat and straight break along the length of the bar. It will be appreciated that although depicted as V-shaped groves other shaped groves, including straight grooves or U-shaped grooves could also be used to the same effect.

Figure 3:
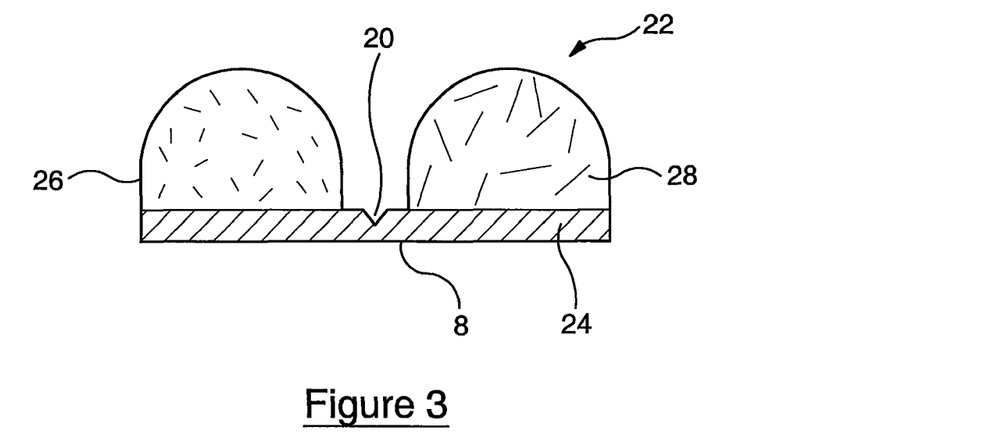
FIG. 3 shows a cross section through a further product in accordance with the invention.

Referring to FIG. 3 a cross section through a further bar 22 of the invention is shown. As can be seen this bar comprises three different confectionery products, a dark chocolate base 24, a white chocolate top 26 forming one finger, and a milk chocolate top 28 forming a second finger. The three products can be extruded together in a single extrusion process. As with the example shown in FIG. 2, a v-shaped groove 20 is provided in the frangible connecting portion 8.

Figure 4:
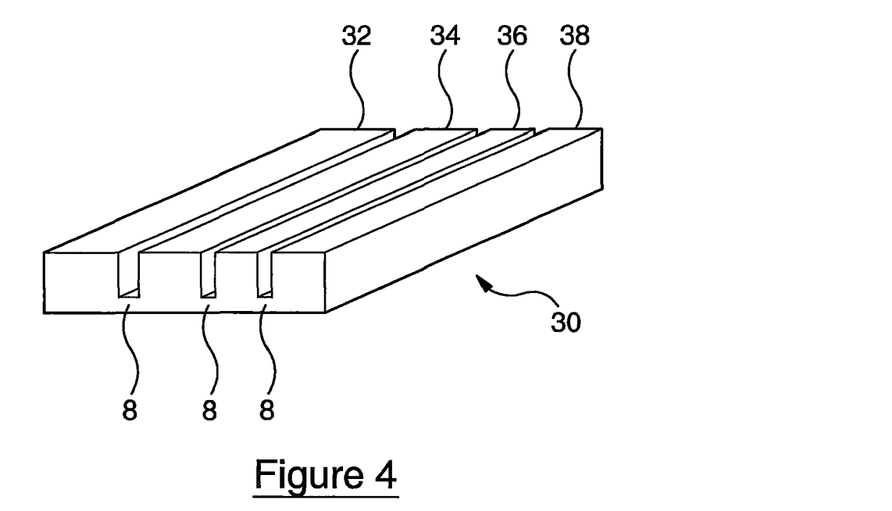
FIG. 4 shows a product in accordance with the invention having four product portions.

Referring to FIG. 4 a four finger extruded bar 30 is shown. This bar is an extruded chocolate bar that comprises a linear array of four fingers 32, 34, 36, 38, each separated from an adjacent finger by a frangible connecting portion 8 that extends along the length of the bar 30. The fingers 32, 34, 36, 38 can be removed from the bar by applying a bending moment to the bar to fracture the connecting portion 8. Although depicted as substantially square bars it will be appreciated that the bars could have more rounded profiles and that the grooves 8 depicted in FIGS. 2 and 3 could also be applied to this design.

Figure 5:
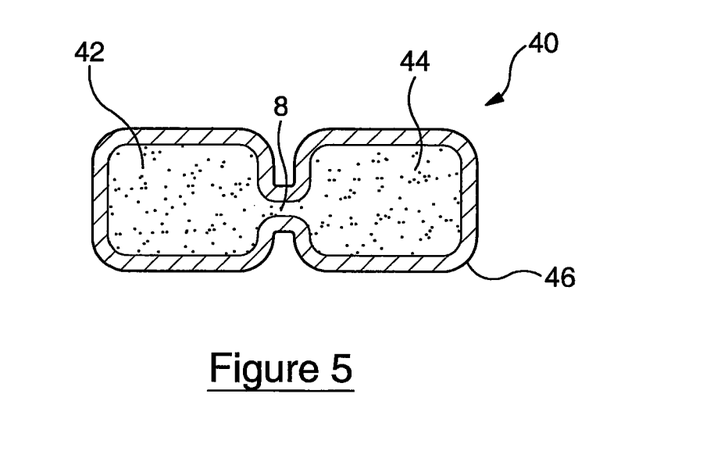
FIG. 5 shows a cross section through a coated product in accordance with the invention.

Referring to FIG. 5 a cross section through an extruded confectionery bar 40 is shown. The confectionery bar 40 comprises two fingers 42, 44 of a fudge, which are joined to one another by a frangible connecting portion 8. The fudge fingers 42, 44 and the frangible portion 8 are all made as a single extrudate. The extrudate is then coated with a chocolate product 46 so as to form a coating thereon.

As with the products described above it will be appreciated that the fudge extrudate will be separated, for example by cutting, into a number of bars 40 of discreet length. The coating process may take place either after the separation so that fully coated products can be produced, or may be executed before the separation process so that the fudge can be seen at the end of the bars 40. The bar 40 can be separated into two separate fingers by bending the bar along its length so that the frangible portion 8, and the chocolate coating in that region, fractures.

As shown the bars 10, 22 and 30 of FIGS. 2, 3 and 4 respectively have substantially flat bottoms and the frangible portion 8 thereof is formed in a recess in the overall shape of the bar which extends downwardly from the top of the bar. The frangible connecting portions 8 of the bars 2, 40 depicted in FIGS. 2 and 5 are formed by two recesses in the overall shape of the bars, one extending downwardly from the top of the bar and the other extending upwardly from the bottom of the bar. As will be appreciated these two design variations are interchangeable between the bars.

Figure 6:
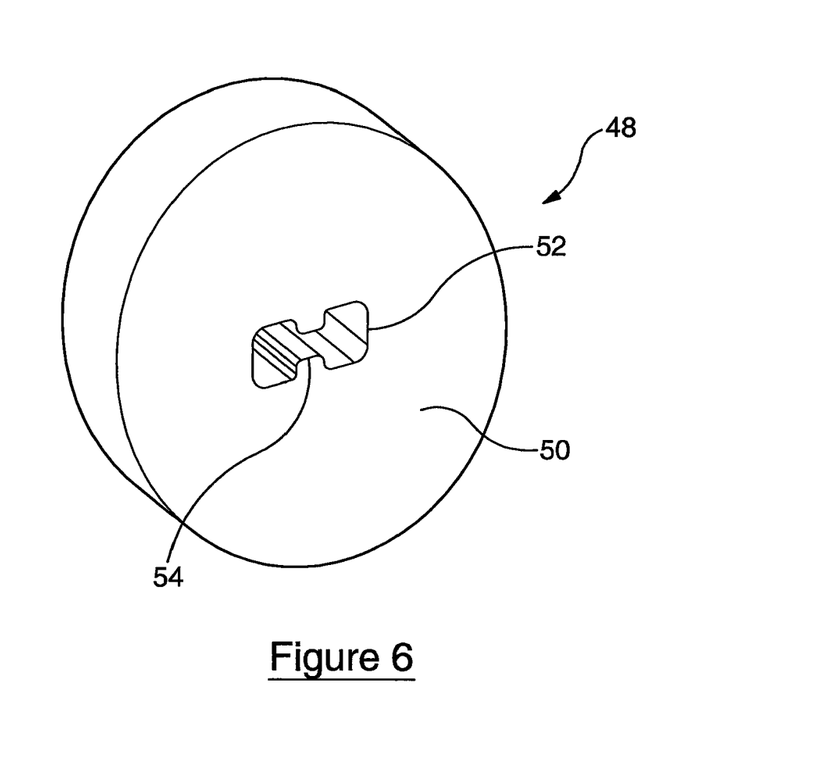
FIG. 6 shows a die for use in a method of the invention.

Referring to FIG. 6 an extrusion die 48 for forming a bar having two confectionery fingers separated by a frangible section is shown. Either the actual confectionery product forming the final bar, e.g. chocolate, can be passed through the die, or alternatively, if a coated product is required, the centre confectionery product of the bar is passed through the die to form the general shape of the bar prior to coating. The die 48 comprises a plate 50 having an orifice therein through which the product is passed in a flowable state. The orifice comprises two larger sections 52 separated by a narrower section 54. As the confectionery product is passed through the die 54 the larger sections 52, which are substantially square and have rounded corners, form the adjacent bars, and the narrow section 54 forms the frangible section interconnecting the two bars. As will be appreciated the die 48 shown will form a product having two fingers. As will also be appreciated the die may be modified to have more than two larger orifices 52 arranged in a row with respective interconnecting narrower portions 54. As will also be appreciated the shape of the opening in the die may be altered to provide bars and frangible portions of other desired profiles, the orifice shape being the negative image of the required bar profile.

Figure 7:
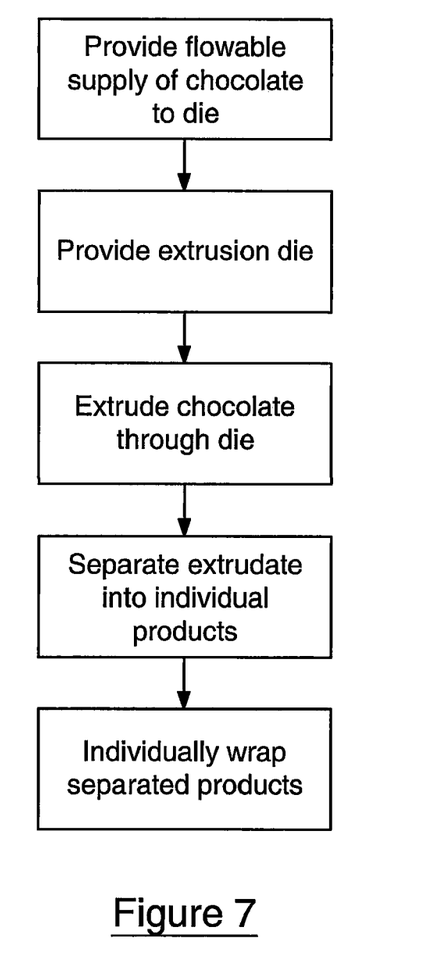
FIGS. 7 to 9 show flow charts of the method in accordance with the invention.

Referring to FIG. 7 a flow diagram of a method of the invention is shown. The method comprises providing a supply of a confectionery product, in this case a milk chocolate product, in a flowable state. An extrusion die having a linear array of interconnected openings is provided and the chocolate is extruded through the die using known extrusion techniques. As the chocolate passes through the die it forms into a continuous strip of chocolate comprising of a number of bars interconnected by thinner frangible portions. It will be appreciated that the die shape may be changed to provide the requisite number of bars, the requisite shape bars, and the requisite interconnecting portions. However, in all embodiments the bars will be interconnected through a thinner frangible portion as described herein.

As the chocolate exits the die it cools and starts to become rigid.

After leaving the die the continuous strip of chocolate is separated into a plurality of products along its length, i.e. it is separated along lines that traverse the extrudate so that short individual lengths of the extrudate each form individual products comprising a plurality of bars interconnected by a frangible portion. The bar is separated by a cutting action while the chocolate is still in a semi soft state.

The individual separated products are then flow wrapped to form a plurality of individually wrapped products.

Figure 8:
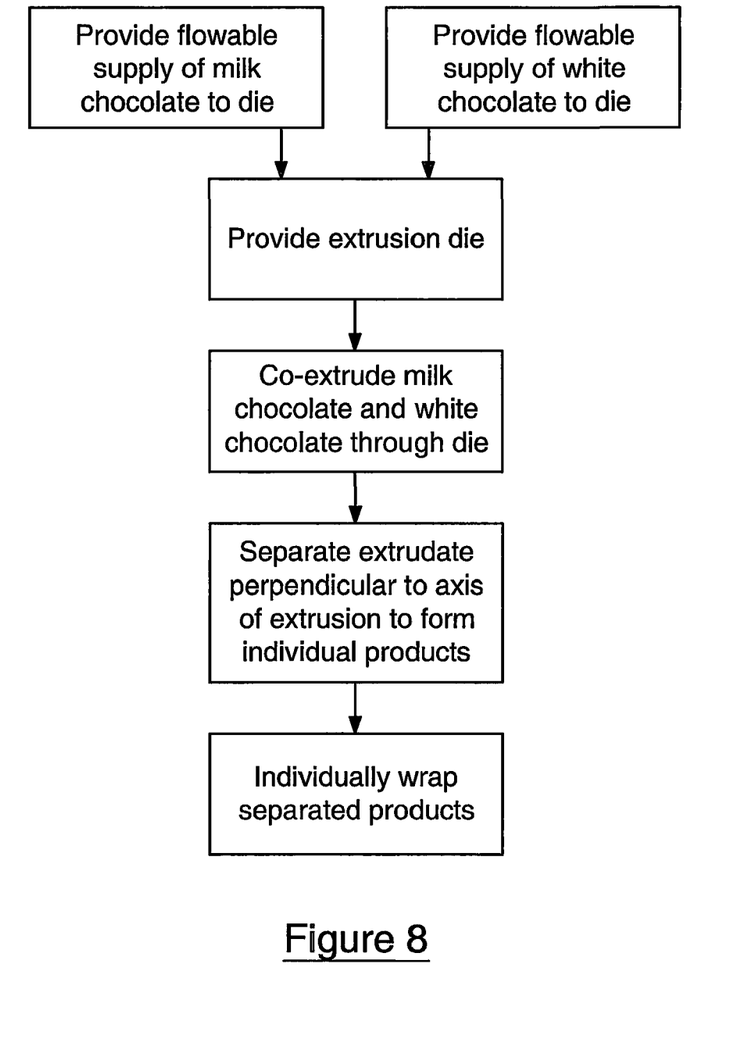

Referring to FIG. 8 a flow diagram of a further method is shown. In this method a confectionery product in manufactured by providing two separate supplies of confectionery product, in this case a milk chocolate and a white chocolate, in a flowable state, to an extrusion die. The extrusion die is provided with a linear array of two openings interconnected by a thinner opening, the thinner opening forming, in use, a frangible portion of extrudate interconnecting two parallel bars. The white and milk chocolate are supplied into the die by separate feed screws as is known in the art and combine in adjacent parallel flows in the die so that the milk chocolate exits the die through one of the openings and the white chocolate exits the die through the other opening. The milk and white chocolate are co-extruded and combine with one another in the thin frangible section interconnecting the two openings while still in their flowable state. The two products adhere together such that the two confectioneries exit the die as a single strip forming a unitary product comprising two chocolate bars (one milk, one white) connected to one another along their length by a frangible connecting portion. As the extrudate exits the die it will begin to cool and solidify.

Prior to fully solidifying the extrudate is cut in a direction substantially perpendicular to its longitudinal axis of extrusion so as to separate it into a plurality of individual confectionery products each comprising a white chocolate and a milk chocolate extruded bar, interconnected by a frangible portion. These portions are then flow wrapped to form a plurality of individually wrapped portions. As the extrudate is of a substantially regular dimension, and is a unitary product thereby maintaining the two bars in adjoined relationship, the flow wrapping of the product is simplified in comparison to flow wrapping two individual bars that are placed adjacent to one another for wrapping. In particular it is advantageous that the cumulative tolerances (tolerance stack) of the bars, and the tolerance of their placement relative to each other, both in respect of width and length is reduced to a single tolerance for the width of the product and a single tolerance for the length of the product.

Although described in relation to the co-extrusion of two products it will be appreciated that more than two products may be coextruded as a single product. Furthermore, although described in relation to extruding a product having two bars of different chocolate it will be appreciated that more than two bars may be extruded through a single die, e.g. three or four, or more, bars may be extruded as a continuous extrudate. It will also be appreciated that although described above as extruding two products so that each bar is of a different material it will be appreciated that the two or more products may form layers running across all the bars so that each bar has a layer of a first confectionery and at least one further layer of a chocolate product. Alternatively, it will be appreciated that two confectionery products may be co-extruded such that one product surrounds the other product.

Figure 9:
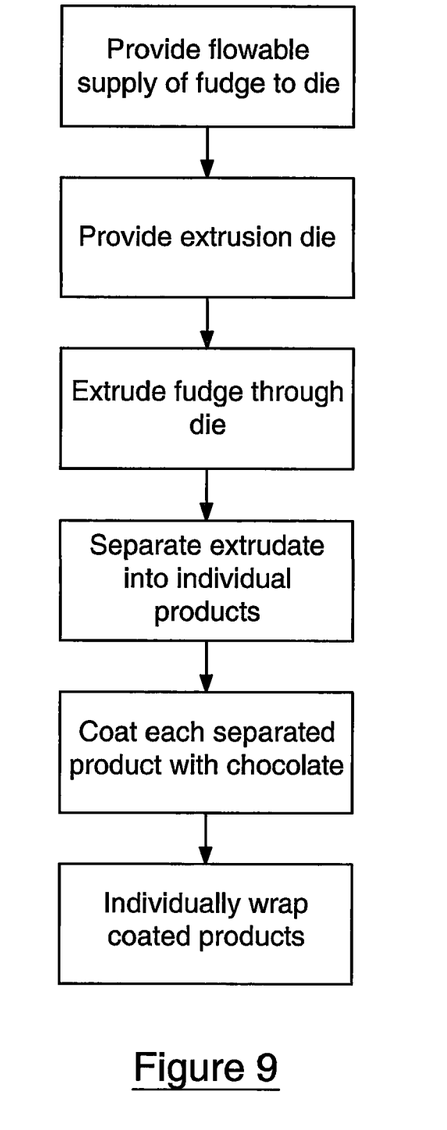

Referring to FIG. 9 a further method of the invention is shown. This method comprises providing a flowable fudge product for extrusion through a die. A die is also provided for extruding the fudge therethrough to form an extrudate comprising a plurality of adjacent fudge bars running parallel to the axis of extrusion. Each of the bars are interconnected with an adjacent bar by a thinner portion of the extruded confectionery such that the thinner portion forms a frangible portion that will fracture when the extrudate is bent about its axis of extrusion. The flowable fudge is extruded through the die to form a continuous confectionery extrudate which is then cut into discreet lengths to form a plurality of separate confectionery items.

The separated items are then passed through a curtain of liquid chocolate so as to coat them in a chocolate, after which they are cooled to solidify the coating thereon.

As the chocolate coating is relatively thin it will not prevent the frangible portions of the extrudate from breaking when a bending moment is applied thereto.

One the coated bars have cooled sufficiently they are wrapped by a flow wrapping process to form individual wrapped coated confectionery bars.

It will be appreciated that although the method discusses coating a fudge based confectionery with chocolate, the coated confectionery could be any suitable confectionery which is capable of being coated, and for which a relatively thin rib will break when subject to a bending moment.

Figure 10:
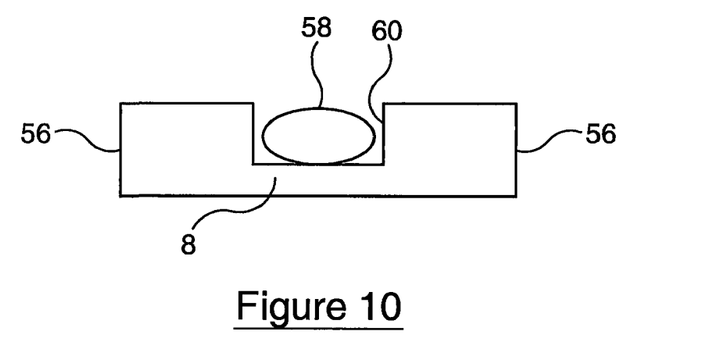
FIG. 10 shows a further product of the invention.

Referring to FIG. 10 an end view of a further product of the invention is shown. The product comprises a length of extruded chocolate comprising two bars 56 connected along their length by a frangible chocolate portion 8. As described above the bars 56 and frangible portion are extruded as a single unitary item. A further confectionery product 58 is added to the recess 60 between the bars 56 after the product is extruded. This confectionery 58 is not extruded but may be filled into the recess 60 in a continuous bead as the chocolate is extruded. The confectionery 58 may be any suitable confectionery which may be in the form of a paste or heat softened product, for example peanut butter or a soft cocoa based product or ganache, which will attach to the chocolate 56. Alternatively it may be added as a stand alone confectionery once the chocolate 56 is sufficiently hardened such that it will not adhere to it and the bead 58 may be removed for consumption separately to the chocolate bars 56.

Although described above in relation to chocolate products it will be understood that the present invention is not limited to chocolate products. In particular, instead of chocolate, the product may comprise one or more of: yoghurt based products, baked or unbaked cereal-based doughs, batter, or cheeses. In a particular example the product may be an extruded wafer, or may be an extruded wafer/chocolate or wafer/creme layered product. Further, the product portions may have a filling created during the extrusion. Any of the abovementioned products may be coated in one or more substance, for example chocolate, yoghurt based product, other confectionery or savoury products etc. If the product comprises an unbaked dough, the product may be baked post extrusion.

Figure 11:
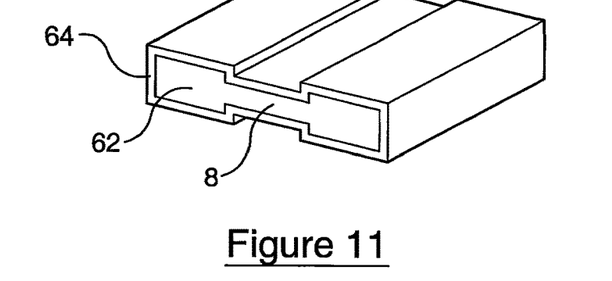
FIG. 11 shows a coated product of the invention.

Referring to FIG. 11 a product of the invention is shown which comprises an extruded wafer product 62 which has the frangible portion 8. The wafer is shown as being coated with a chocolate coating 64, although it will be appreciated that this coating need not form part of the product. As shown, the product portions of this product are shorter such that when broken along the frangible portion 8 two bite sized pieces are formed.

Figure 12:
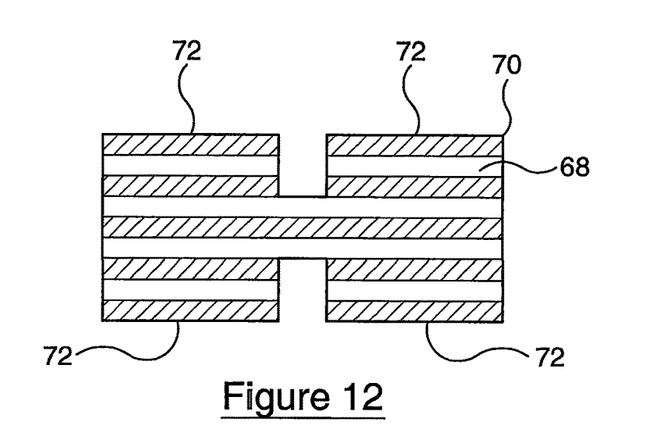
FIG. 12 shows a layered product in accordance with the invention.

Referring to FIG. 12 a cross section of a layered product is shown. Alternating layers can be wafer 68 and a confectionery product 70, for example chocolate or a creme. It will be appreciated that either the wafer layer or the confectionery layer may form the outermost layers 72 of the product. As with the product shown in FIG. 11, the product of FIG. 12 may optionally have a coating applied thereto.

Figure 13:
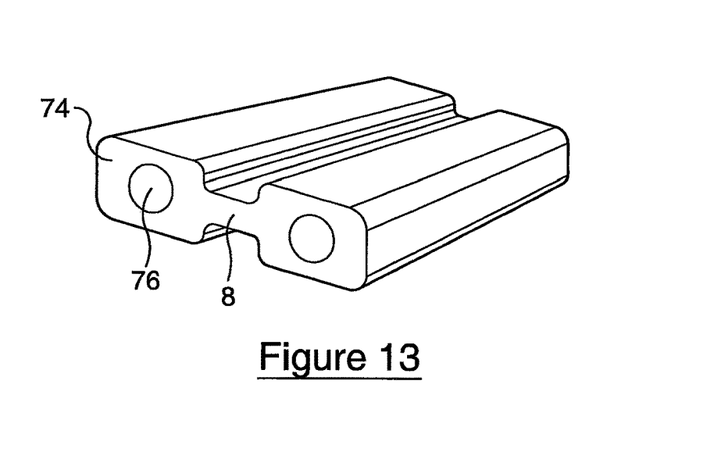
FIG. 13 shows a filled product in accordance with the invention.

Referring to FIG. 13, a product comprising biscuit dough 74 is shown. The biscuit dough may either be cooked prior to extrusion or after extrusion. As can be seen the dough is filled with a second product 76, for example chocolate. The filling is co-extruded with the dough. As can be seen the dough forms the frangible portion 8 and the filling is contained within each product section. If the product is cooked after extrusion the extrudate may be passed through an oven prior to being cut into individual product lengths.

The foregoing examples are not intended to limit the scope of protection afforded by the claims, but rather to describe examples as to how the invention may be put into practice.

The invention claimed is:

1. A method of manufacturing an edible product comprising:
   providing an extrusion die having a linear array of at least two interconnected openings therein, adjacent openings being separated by an interconnecting section; and
   extruding one or more edible materials comprising chocolate through said extrusion die so as to produce an edible product comprising a plurality of extruded product portions connected to one another along their length by a frangible connecting portion, formed during the extruding, which extends continually along the length of the product and has at least one groove therein, formed during the extruding, defining a preferential break line,
   wherein the height of the or each interconnecting section is less than that of the openings such that the frangible connecting portion is thinner than the product portions, and
   wherein the or each interconnecting section has a width of from 5% to 80% of the width of the openings.

2. The method according to claim 1 further comprising:
   co-extruding two or more of the edible materials through said extrusion die so as to produce an edible product comprising two or more co-extruded product portions.

3. The method according to claim 1, further comprising at least partially coating said edible product with one or more edible coating materials.

4. The method according to claim 1 wherein providing an extrusion die comprises providing an extrusion die wherein the height of the interconnecting section between the openings is from 5% to 75% of the height of the openings and the width of the interconnecting section is from 15% to 80% of the width of the openings.

5. The method according to claim 1, comprising providing the edible material(s) with one or more types of particulate inclusion prior to extrusion.

6. The method according to claim 1 wherein said extrusion is effected to produce at least one hollow product portion.

7. The method according to claim 6 additionally comprising providing a filling in the said at least one hollow product portion, said filling being a solid or liquid.

8. The method according to claim 3, wherein the edible coating material is a confectionery material.

9. The method according to claim 8, wherein the confectionery material is a chocolate or a yoghurt based material.

10. The method according to claim 5, wherein the one or more types of particulate inclusion is selected from a group consisting of: chocolate chips, nut pieces, fruit pieces, flavour chips, dried herbs and spices, toffee pieces, biscuit pieces, cake pieces, sugar-confectionery pieces, and dragees.

11. The method according to claim 1, comprising providing the edible material(s) with one or more liquid inclusions or components prior to extrusion.

12. The method according to claim 11, wherein the one or more liquid inclusions or components is selected a group consisting of: caramel, fruit paste, cream, cream cheese, other soft cheeses, and liquid flavor bubbles.

13. The method according to claim 7, wherein the solid or liquid filling is selected from a group consisting of: liquid chocolate, caramel, praline, toffee, fudge, sugar and sugarless syrups, peanut butter, cream, soft cheese, fruit paste, cake material, nut paste and truffle.

14. The method according to claim 1, wherein the groove is selected from a group consisting of: an angled recess, a U-shape recess or a V-shaped recess.

* * * * *